Figure 1:
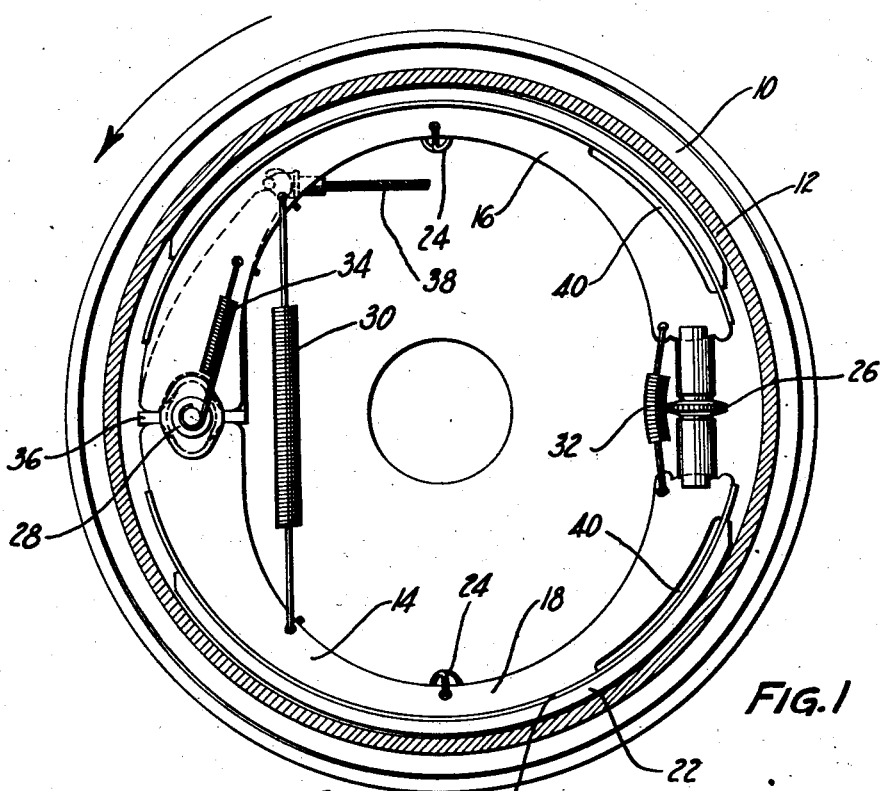

May 21, 1935. F. H. WELLS 2,001,994
BRAKE
Filed July 23, 1931

INVENTOR.
FRANKLIN H. WELLS
BY
ATTORNEY.

Patented May 21, 1935

2,001,994

UNITED STATES PATENT OFFICE 2,001,994

BRAKE

Franklin H. Wells, South Bend, Ind., assignor to Bendix Brake Company, South Bend, Ind., a corporation of Illinois Application July 23, 1931, Serial No. 552,694

4 Claims. (Cl. 188—78)

This invention relates to brakes and more particularly to internal expanding brakes.

The conventional servo brake increases in effectiveness as the input of the brake is increased. This results in a feeling to the operator of grabbing or winding up of the brake at the high pedal pressures and this sensation is very objectionable and annoying. Efforts to remedy this condition have in general been fruitless since any reduction of the servo action, due to alterations in the shoe web, lining, etc., has lowered both the initial effectiveness as well as the final effectiveness. However, initial effectiveness or effectiveness at light pressure is desirable.

There are few brakes in which a reduction of the servo action is most effective at high pressure and some of these have given satisfactory performances. However, they are so designed that they involve the structure and add materially to the cost of production. Furthermore, there is the additional possibility that the action of rust and dirt on such types as are now in use will reduce the brake at low pedal pressure as well as at high.

It is the aim of the present invention to provide a servo brake in which provision is made for the control of the servo action.

An important object of the invention is to provide a servo brake in which the effectiveness of the brake may be controlled through a smooth easy pedal pressure in which a reduction of the servo action is most effective at high pedal pressures.

A further object of this invention is to provide a brake shoe of such a structure that the thrust on the adjusting member is not distributed over the entire surface of the lining or concentrated at the adjusting screw as is the case with a rigid shoe or one of like character.

A further object of the invention is to provide a brake shoe of such a structure that the applied pressure, particularly if of great magnitude, acts mainly towards the center and anchor end of the shoe.

A further object of the invention is to provide a brake shoe having a flexible zone positioned to avoid heavy concentration of pressure at the thrust receiving end of the shoe.

A feature of the invention is a brake shoe having a slot arranged in its web adjacent to its rim and positioned at one end of the shoe, so that the output of the shoe at high pressure is materially reduced.

Another feature of the invention is to provide a brake including a primary and a secondary shoe connected by an adjusting member, each shoe having a web provided with a longitudinal slot arranged adjacent to the adjusting member, to provide a cushioning effect where the primary shoe thrust is received by the secondary shoe.

Figure 2:
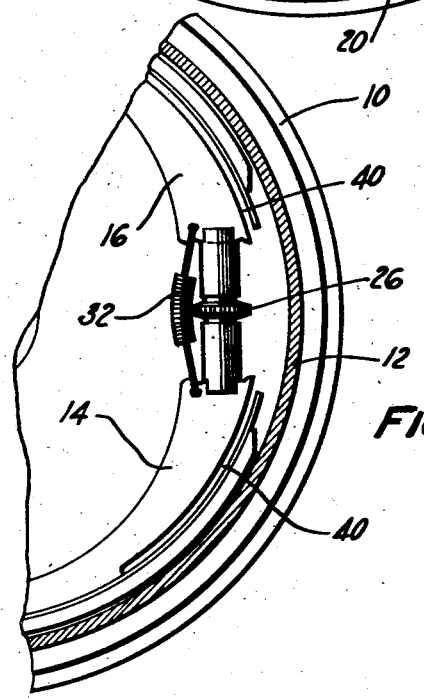

Other objects and features of the invention will appear from the following description taken in connection with the drawing, which forms a part of this specification, and in which:

Fig. 1 is a vertical sectional view of a brake taken back of the head of the drum illustrating the friction element in side elevation and showing the invention as applied; and Fig. 2 is a similar view partly broken away illustrating a modification of the invention.

Referring to the drawing for more specific details of the invention, 10 represents a fixed support such as a backing plate. The backing plate has associated therewith a rotatable drum 12, which may be secured to a wheel not shown.

Positioned for movement on the backing plate is a primary shoe 14 and a secondary shoe 16. These shoes are of the conventional type, each includes a web 18 supporting a rim 20 to which is suitably secured a lining 22 adaptable for cooperation with the braking surface of the drum.

The shoes are supported on the backing plate by suitable steady rests 24. As shown, they are connected to their articulated ends by a suitable adjusting member or screw 26 and positioned between their separable ends is a single fixed anchor 28.

The shoes are connected by suitable return springs 30 and 32 and the shoe 16 is connected by a return spring 34 to the anchor 28. These springs serve to return and retain the shoes in the off position. An operating lever 36 is positioned on the anchor 28 between the separable ends of the shoes 14 and 16 and a tension member 38 connects the operating lever to a suitable source of power, not shown.

In the preferred embodiment of the invention, the shoes 14 and 16 are provided with longitudinal slots 40 preferably positioned in the webs immediately beneath the rims to provide flexible zones. These zones are in the ends of the shoes nearest the adjusting member. By reason of the flexible zones the thrust on the adjusting member is not distributed over the entire surface of the linings on the shoes, nor concentrated at the adjusting member as would be the case with rigid shoes or shoes having a solid web. Instead, the pressure, particularly if of a great magnitude, acts mainly towards the center and anchor end of the shoes. Shoes having slots arranged in the webs thereof in the manner shown in Fig. 1 are sufficiently flexible to prevent any heavy concentration of pressure at their ends adjacent the adjusting member.

It is well established that pressure on the end of the shoe adjacent the adjusting member is more effective than elsewhere on the shoe. Hence it will be understood that in a shoe made flexible at this point the output of the shoe at high pressure will be materially reduced. It will also be understood that at low pressure a shoe of this type is still sufficiently rigid to provide the same characteristics of a standard brake shoe and thus the initial pressure to obtain a given brake output has not been increased.

A modification of the invention is illustrated in Fig. 2, wherein the slot 40 is extended to the extreme end of the shoe, so that additional flexibility may be had in instances where desired. It will, of course, be understood that the slots 40 may be easily extended to produce any degree of flexibility desired.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake shoe comprising a web having a portion cut away from its outer periphery adjacent one end of the shoe, and a rim assembled on the web and engaging said web throughout most of the length of the shoe and having a flexible yielding zone over the cutaway portion, said rim being directly engaged and supported by the web on both sides of the yielding zone.

2. A brake comprising two friction elements, and a floating adjusting member connecting the elements, said elements having cushioning zones immediately adjacent the adjusting member and being substantially rigid for the remainder of their lengths.

3. A brake shoe having a rim, a web on which the rim is mounted and which at one end has a cutaway portion leaving a portion of the rim unsupported on its inner face, and an adjustment engaging said end of the web.

4. A brake shoe having a rim, a web on which the rim is mounted and which at one end has a cutaway portion leaving a portion of the rim unsupported on its inner face, and a lengthwise movable thrust member engaging said end of the web.

FRANKLIN H. WELLS.